United States Patent
Givoly et al.

(10) Patent No.: US 7,124,204 B2
(45) Date of Patent: Oct. 17, 2006

(54) THRESHOLD-BASED DATABASE SYNCHRONIZATION SYSTEM AND METHOD

(75) Inventors: Tal Givoly, Cupertino, CA (US); Limor Schweitzer, Santa Clara, CA (US)

(73) Assignee: Amdocs (Israel) Ltd., Ra'anana (IL)

( * ) Notice: Subject to any disclaimer, the term of this patent is extended or adjusted under 35 U.S.C. 154(b) by 1143 days.

(21) Appl. No.: 10/045,609

(22) Filed: Oct. 23, 2001

(65) Prior Publication Data

US 2002/0199024 A1 Dec. 26, 2002

Related U.S. Application Data

(63) Continuation-in-part of application No. 09/442,876, filed on Nov. 18, 1999, now Pat. No. 6,418,467.

(60) Provisional application No. 60/242,737, filed on Oct. 23, 2000.

(30) Foreign Application Priority Data

Sep. 14, 2000 (IL) ..................................... 138471

(51) Int. Cl.
*G06F 15/16* (2006.01)
(52) U.S. Cl. .............................. 709/248; 707/1; 705/1
(58) Field of Classification Search ................ 709/248; 707/201, 1; 375/137, 134, 356; 705/1
See application file for complete search history.

(56) References Cited

U.S. PATENT DOCUMENTS

| 5,991,771 A * | 11/1999 | Falls et al. ................... 707/202 |
| 6,192,365 B1 * | 2/2001 | Draper et al. ................ 707/101 |
| 6,212,529 B1 | 4/2001 | Boothby et al. ............. 707/201 |
| 2002/0039904 A1 * | 4/2002 | Anderson .................... 455/456 |

* cited by examiner

*Primary Examiner*—Frantz B. Jean
(74) *Attorney, Agent, or Firm*—Zilka-Kotab, PC

(57) ABSTRACT

A system, method and computer program product are provided for decreasing the time with which a first table and a second table is synchronized. Initially, a threshold value amount, i.e. monetary value, is identified. In use, the first table and the second table are synchronized. The manner (such as speed) with which the synchronization is executed may then be based on the threshold value amount.

24 Claims, 9 Drawing Sheets

THRESHOLD-BASED DATABASE SYNCHRONIZATION SYSTEM AND METHOD

RELATED APPLICATION(S)

The present application is a continuation-in-part of an application filed Nov. 18, 1999 under Ser. No. 09/442,876, now U. S. Pat. No. 6,418,467 which is incorporated herein by reference in its entirety. The present application also claims priority from a provisional application filed Oct. 23, 2000 under Ser. No. 60/242,737, which is incorporated herein by reference in its entirety.

FIELD OF THE INVENTION

The present invention relates to data synchronization, and more particularly to improving performance during data synchronization.

BACKGROUND OF THE INVENTION

Database synchronization may be carried out utilizing various tools and methods. Numerous log-based replication tools replicate data in one database into one or more replicas. This is accomplished by reading committed transactions from a transaction log of the database in which the update is made, and performing the same updates in all of the replicas in the network. Depending upon the vendor and configuration options, the updates are either always made at a primary site and then propagated to the replicas, or the updates are made at any site and propagated to all other sites. To achieve high availability, these systems often employ a primary-standby primary scheme, where the standby primary is a replica that becomes the primary in the event of the failure of the original primary.

Unfortunately, a number of events can and often occur which prevent conventional database synchronization from being highly available. For example, an error may result from synchronization procedures due to the use of communication pathways which introduce errors into the data or losses of data which is being passed between replicas of the database. Most often, an amount of these errors and losses is proportional to a speed with which synchronization is executed. Errors can often be rectified by reducing the speed with which the synchronization is executed, or executing a re-synchronization or repair tool, etc.

In some cases, the data that has not synchronized properly is of only a trivial importance. As such, the benefits of running database synchronization at accelerated speeds would outweigh the cost of any data loss. Unfortunately, there is currently no way of quantifying the cons corresponding to data loss, and making any type of decision based thereon.

There is therefore a need for a technique of quantifying the loss of data during database synchronization for the purpose of increasing a speed of the synchronization to a maximum threshold.

DISCLOSURE OF THE INVENTION

A system, method and computer program product are provided for decreasing the time with which a first table and a second table is synchronized. Initially, a threshold value amount, i.e. monetary value, is identified. In use, the first table and the second table are synchronized. The manner (such as speed) with which the synchronization is executed may then be based on the threshold value amount.

In the preferred embodiment of the present invention, the threshold value amount is indicative of a value amount that corresponds to a lack of perfection of the synchronization between the first table and the second table. As an option, the components of the data being synchronized may have a value amount associated therewith. As such, occurrences of when data is not synchronized between the first table and the second table may be tracked, and the values associated with the data may be identified and added to determine if the threshold value amount is exceeded. Optionally, the synchronization may be rejected if the threshold value amount is exceeded.

In another embodiment, the tables may be components of databases. Further, at least one of the databases may be persistent. As an option, the first table and the second table may be synchronized utilizing the Internet.

As an option, it may be determined whether users are affected by the lack of perfect synchronization between the first table and the second table. Further, a specific number of users affected by the lack of perfect synchronization between the first table and the second table may be determined. Accordingly, the manner with which the synchronization is executed may then be based on the determined number of affected users, or the synchronization may be rejected if the number of users exceeds a predetermined amount.

DESCRIPTION OF THE PREFERRED EMBODIMENTS

Figure 1:
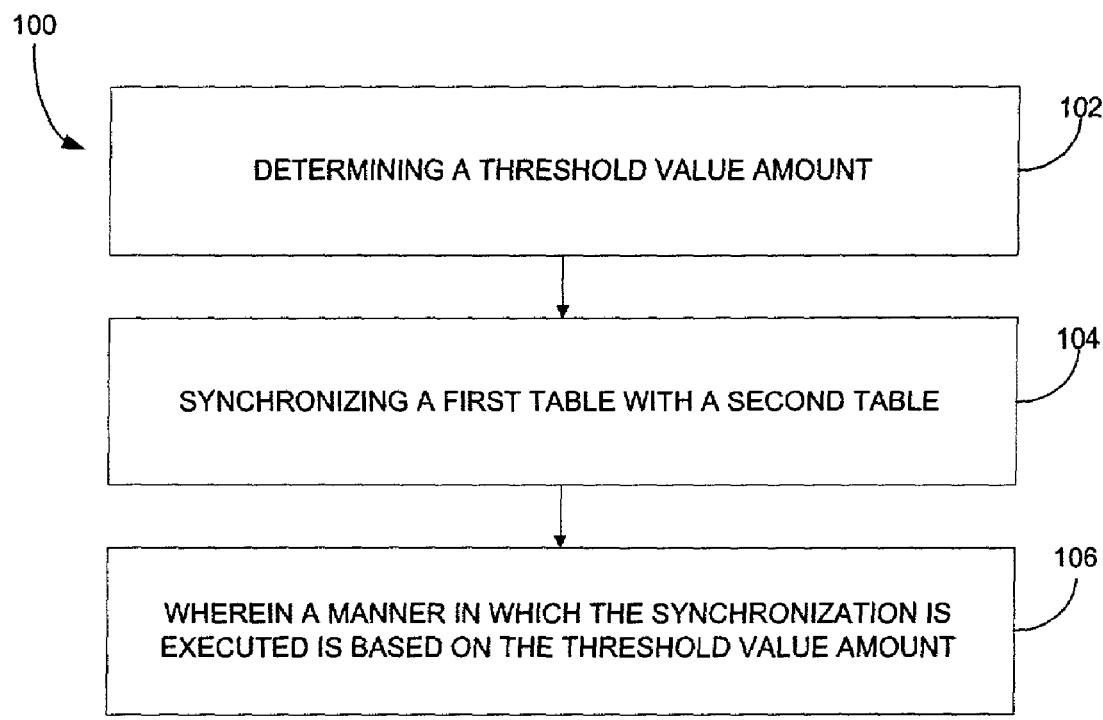
FIG. 1 illustrates a method for decreasing the time with which a first table and a second table is synchronized.

FIG. 1 illustrates a method 100 for decreasing the frequency of synchronization operations and the time with which a first table and a second table are synchronized. It should be noted that such tables may refer to any data structure in or out of the context of a database, and they may reside in persistent or non-persistent storage.

Initially, a threshold value amount is identified in operation 102. The threshold value amount may be determined by any means, and may further be user-configurable. It should be understood that the threshold value amount is indicative of a value amount that corresponds to a lack of perfection of the synchronization between the first table and the second table. If the difference between the first table and the second table is represented as d, the threshold value is a function of d. Such value amount may take any form including, but not limited to a monetary value, etc.

In use, the first table and the second table are synchronized. See operation 104. Optionally, the first table and the second table may be synchronized utilizing the Internet with TCP/IP or IPX protocol. As such, the manner with which the synchronization is executed may be based on the threshold value amount. Note operation 106. In one embodiment, the trigger with which the synchronization is executed may be based on the threshold value amount. In any case, the manner in which synchronization is executed may be directly based on a single entity or value other than the number or size of lost data, thus the operation is of "O(1)".

The step of determining if the threshold value amount is reached may be accomplished in any desired manner. For example, the components of the data being synchronized may have a value amount associated therewith. Specifically, such components may refer to network events or usage which each have an associated monetary value. Table 1 illustrates such a relation in accordance with the present example.

TABLE 1

| EVENT | MONETARY VALUE |
| --- | --- |
| HTTP Session | $1.23/page |
| Voice over IP Session | $0.10/minute |
| Electronic Mail Session | $0.03/attachment |

Given the above relation between network events or usage and a monetary value, occurrences maybe tracked when data associated with such network events or usage is not synchronized between the first table and the second table. Moreover, the values associated with the data may be identified and added to determine a sum. Such sum may, in turn, be compared to the threshold value amount in order to determine if the same has been exceeded. In one embodiment, such running total or sum may be maintained in each database in the form of a table.

If the threshold value amount is exceeded, the synchronization may optionally be rejected. Rejection of the synchronization may result in any action including, but not limited to executing a re-synchronization operation or executing repair tools, etc.

Figure 2:
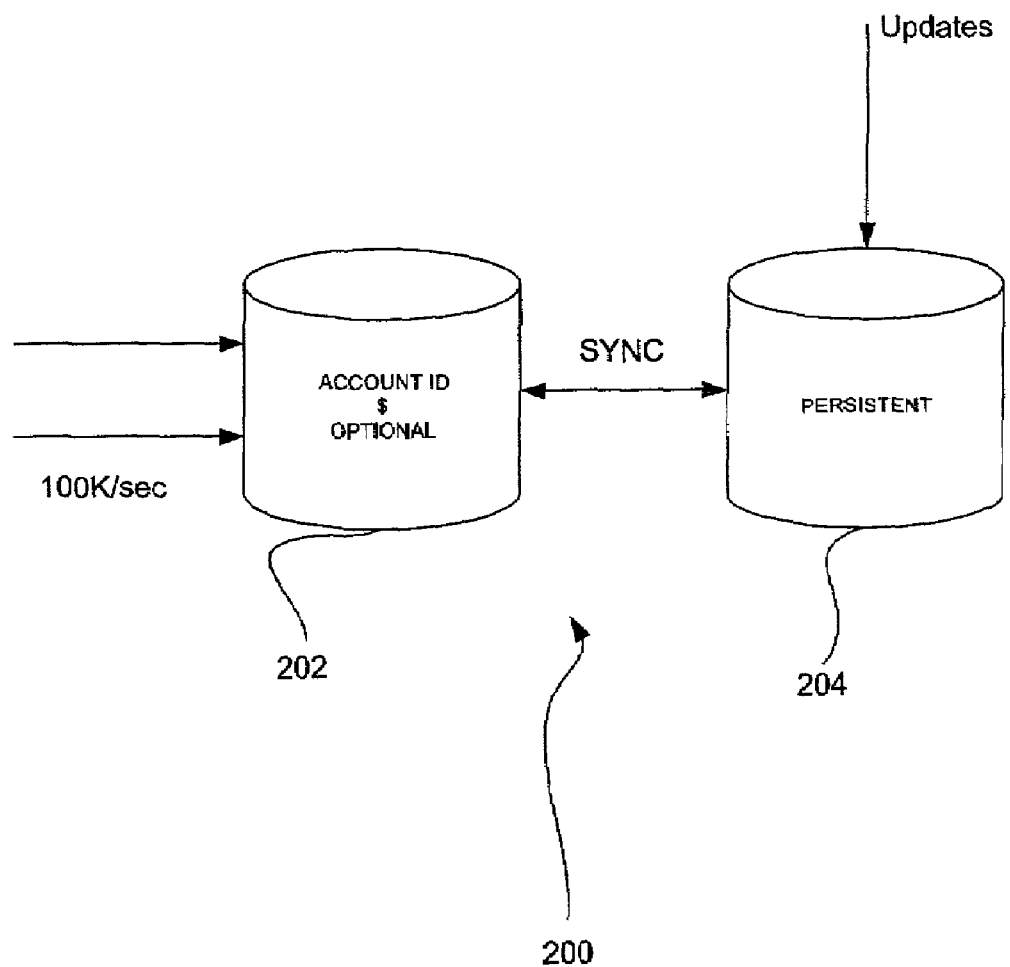
FIG. 2 illustrates a system including a pair of databases on which the tables are resident, in accordance with one embodiment of the present invention.

FIG. 2 illustrates system 200 including a pair of databases on which the tables are resident, in accordance with one embodiment of the present invention. As shown, a first database 202 is provided which receives data at a predetermined rate, i.e. 100 K/sec. Such data may relate to any desired subject matter. In one embodiment, such data may include network accounting information in the form of records.

Also included is a second database 204 which is adapted to be synchronized with the first database 202. In one embodiment, the second database 204 may be persistent. Further, it may also receive updates which may be synchronized with the first database 202. It should be understood that any number of databases may be included in the present example.

As an option, it may be determined whether data related to a particular user is affected by the lack of perfect synchronization between the first table and the second table. Optionally, it may be determined whether data related to a set of users is affected by the lack of perfect synchronization between the first table and the second table. Further, data related to a specific number of users affected by the lack of perfect synchronization between the first table and the second table may be determined. As an option, such number of users may only reflect those that have been affected beyond the threshold value amount.

Accordingly, the synchronization may be rejected if data related to a particular user or a set of users is affected, or if the number of users exceeds a predetermined amount with or without regard to whether the threshold value amount has been exceeded. In another embodiment, separate thresholds may be established for each user, and each threshold may represent a maximum amount of monetary value for that user. In still another embodiment, the threshold may be an average value considering the total amount and the number of users. In still another embodiment, the manner with which the synchronization is executed may be varied based on the number of users affected by the data loss due to failed synchronization.

Figure 3:
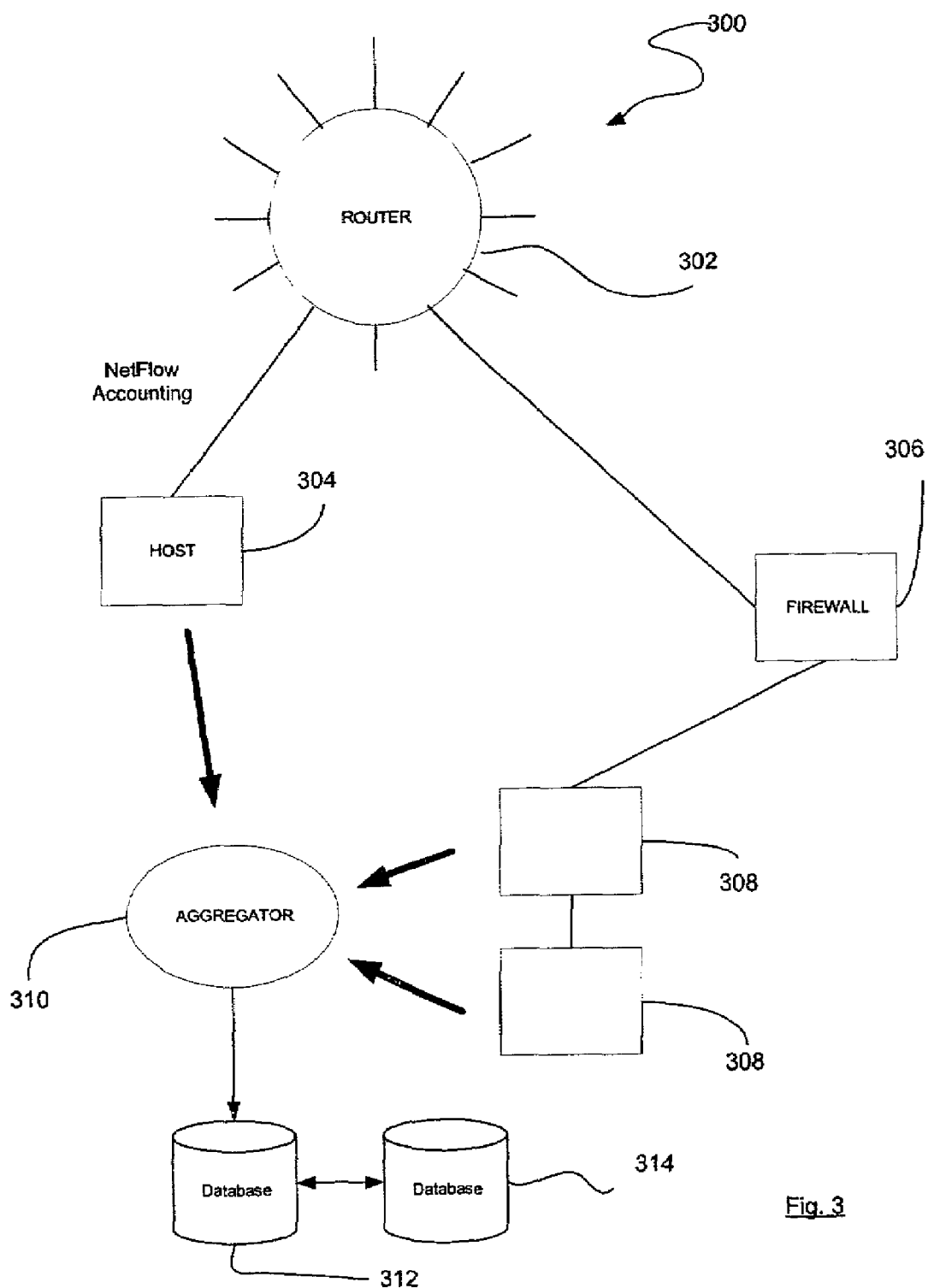
FIG. 3 illustrates an exemplary network framework on which one embodiment of the present invention may be implemented.
Figure 4:
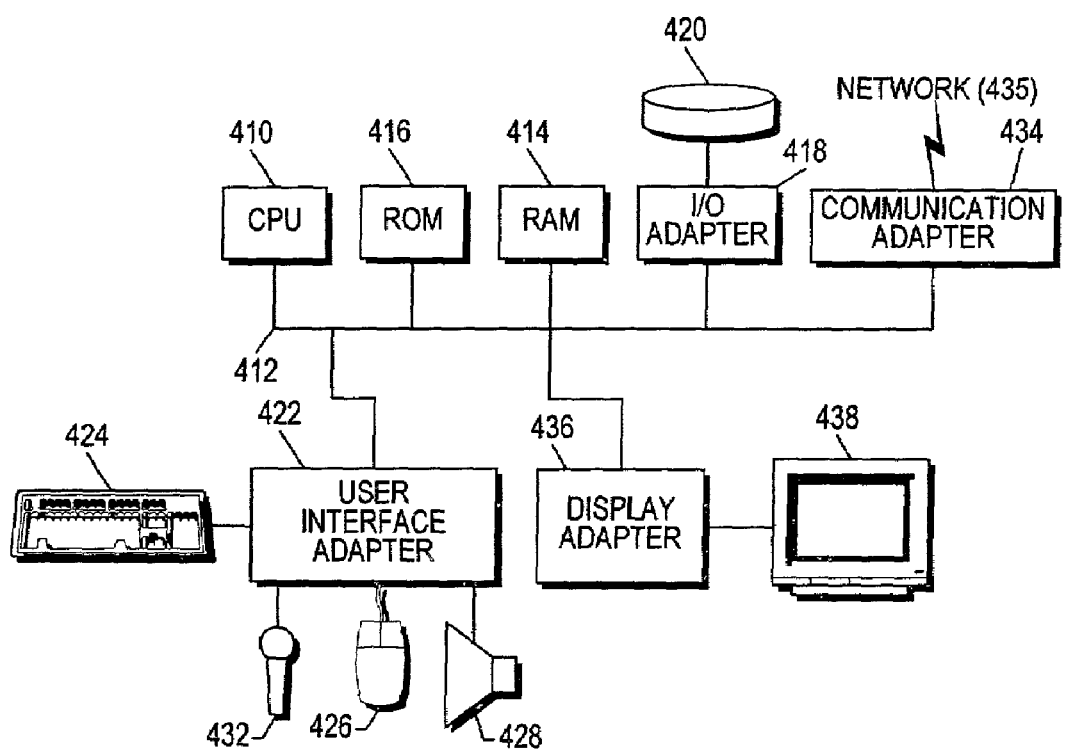
FIG. 4 shows a representative hardware environment associated with the various devices, i.e. host, etc., shown in the network diagram of FIG. 3.

In one embodiment of the present invention, the data received by the first database 200 and synchronized with the second database 204 may take the form of network accounting records. Examples of such records may include, but are not limited to a customer identifier, session's source address, destination address, duration, time, date, type of server, volume of data transferred, etc. FIGS. 3 and 4 illustrate an exemplary environment in which such synchronization may take place.

FIG. 3 illustrates an exemplary network framework 300 on which one embodiment of the present invention may be implemented. It should be noted that the network framework 300 of FIG. 3 need not necessarily be used, and any type of network framework may be utilized per the desires of the user. As shown in FIG. 3, various network components may be provided including a router 302 for routing information between various portions of the network. In one embodiment, such network may include the Internet using a communication protocol such as TCP/IP or IPX. It should be noted, however, that the network may include any type of network including, but not limited to a wide area network (WAN), Metropolitan Area Network (MAN), local area network (LAN), etc.

Further provided is a host 304 coupled to the router 302 for sending information thereto and receiving information therefrom. A firewall 306 may also be coupled to router 302 for controlling access to a network or a plurality of interconnected devices 308. While various network components have been disclosed, it should be understood that the present invention may be implemented in the context of any type of network architecture and in any type of network device such as proxy servers, mail servers, hubs, directory servers, application servers, AAA (Authentication, Authorization, Accounting) servers, etc.

Coupled to the various network devices is an aggregator 310. In use, the aggregator 310 receives records from the devices for the purpose of aggregating the same. In the present description, aggregation refers to consolidation, analysis, or any other type of handling of data. Once aggregated, the records may be used to afford any desired type of service, OSS (Operational Support System), and/or BSS (Business Support System), i.e. billing, fraud detection, network monitoring, traffic engineering, etc. By this structure, a first database 312 may receive network accounting information in the form of records which may, in turn, be synchronized with a second database 314.

FIG. 4 shows a representative hardware environment associated with the various devices, i.e. host, etc., shown in the network diagram of FIG. 3. Such figure illustrates a typical hardware configuration of a workstation in accordance with a preferred embodiment having one or multiple central processing units 410, such as a microprocessor, and a number of other units interconnected via a system bus 412. The workstation shown in FIG. 4 includes a Random Access Memory (RAM) 414, Read Only Memory (ROM) 416, an I/O adapter 418 for connecting peripheral devices such as disk storage units 420 to the bus 412, a user interface adapter 422 for connecting a keyboard 424, a mouse 426, a speaker 428, a microphone 432, and/or other user interface devices such as a touch screen (not shown) to the bus 412, communication adapter 434 for connecting the workstation to a communication network 435 (e.g., a data processing network) and a display adapter 436 for connecting the bus 412 to a display device 438.

The workstation may have resident thereon an operating system such as the Microsoft Windows NT or Windows Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

For further information on another exemplary architecture embodiment, reference may be made to PCT application WO9927556A2 entitled "NETWORK ACCOUNTING AND BILLING SYSTEM AND METHOD" published Jun. 3, 1999, which is incorporated herein by reference in its entirety. More information on such exemplary system will be set forth hereinafter starting with reference to FIG. 5.

It should be noted that the foregoing architectures should not be construed as limiting in any manner, and should be taken to merely represent exemplary systems for illustrative purposes only. For example, the present embodiment may be implemented in the context of any chip, host, router, network device, architecture, etc. that is desired.

Alternate Exemplary Embodiment

One embodiment of a system in which the foregoing details may be implemented will now be set forth. Of course, the following description should not be construed as limiting in any manner, and should be taken to represent merely an exemplary system for illustrative purposes.

The present embodiment includes a multi-source, multi-layer network usage metering and mediation solution that gives Network Service Providers (NSPs), including Internet Service Providers (ISPs) and enterprise network (Intranet) operators, the information needed to set the right-price for IP(Internet Protocol) services. With the system, the providers can generate accurate usage-based billing and implement usage-based charge-back models. The system derives IP session and transaction information, collected in real time, from a multitude of network elements. The system gathers, correlates, and transforms data from routers, switches, firewalls, authentication servers, LDAP, Web hosts, DNS, and other devices to create comprehensive usage and billing records.

The system transforms raw transaction data from network devices into useful billing records though policy-based filtering, aggregation, and merging. The result is a set of detail records (DRs). In some embodiments, the detail records are XaCCT Detail Records (XDRs™) available from XaCCT Technologies. DRs are somewhat similar in concept to the telephony industry's Call Detail Records (CDRs). Thus, DRs can be easily integrated with existing Customer Care and Billing (CCB) systems.

In addition to billing data, DRs enable NSPs to deploy new services based on documented usage trends, plan network resource provisioning, and audit service usage. The system provides a clear picture of user-level network service use by tracking a variety of metrics such as actual session Quality of Service (QoS), traffic routes, and end-user application transactions.

The system is based on a modular, distributed, highly scalable architecture capable of running on multiple platforms. Data collection and management is designed for efficiency to minimize impact on the network and system resources.

The system minimizes network impact by collecting and processing data close to its source. Modular architecture provides maximum configuration flexibility, and compatibility with multiple network information sources.

The system, or other embodiments, may have one or more of the following features.

Data collection can be from a wide range of network devices and services, spanning all layers of the network—from the physical layer to the application layer.

Real-time, policy-based filtering, aggregation, enhancement and merging create accurate, detailed and comprehensive session detail records(DRs).

Real time correlation of data from various sources allows billing record enhancement.

Leverages existing investment through integration with any customer care & billing solution, reducing costs, minimizing risks and shortened time-to-market.

Non-intrusive operation eliminates any disruption of network elements or services.

Web-based user interface allows off-the-shelf browsers to access the system, on-demand, locally or remotely.

Carrier-class scalability allows expansion to fit an NSPs needs without costly reconfiguration.

Distributed filtering and aggregation eliminates system capacity bottlenecks.

Efficient, centralized system administration allows on-the-fly system reconfigurations and field upgrades.

Customized reporting with built-in report generation or an NSPs choice of off-the-shelf graphical reporting packages.

Comprehensive network security features allow secure communication between system components and multiple levels of restricted access.

System Details

Figure 5:
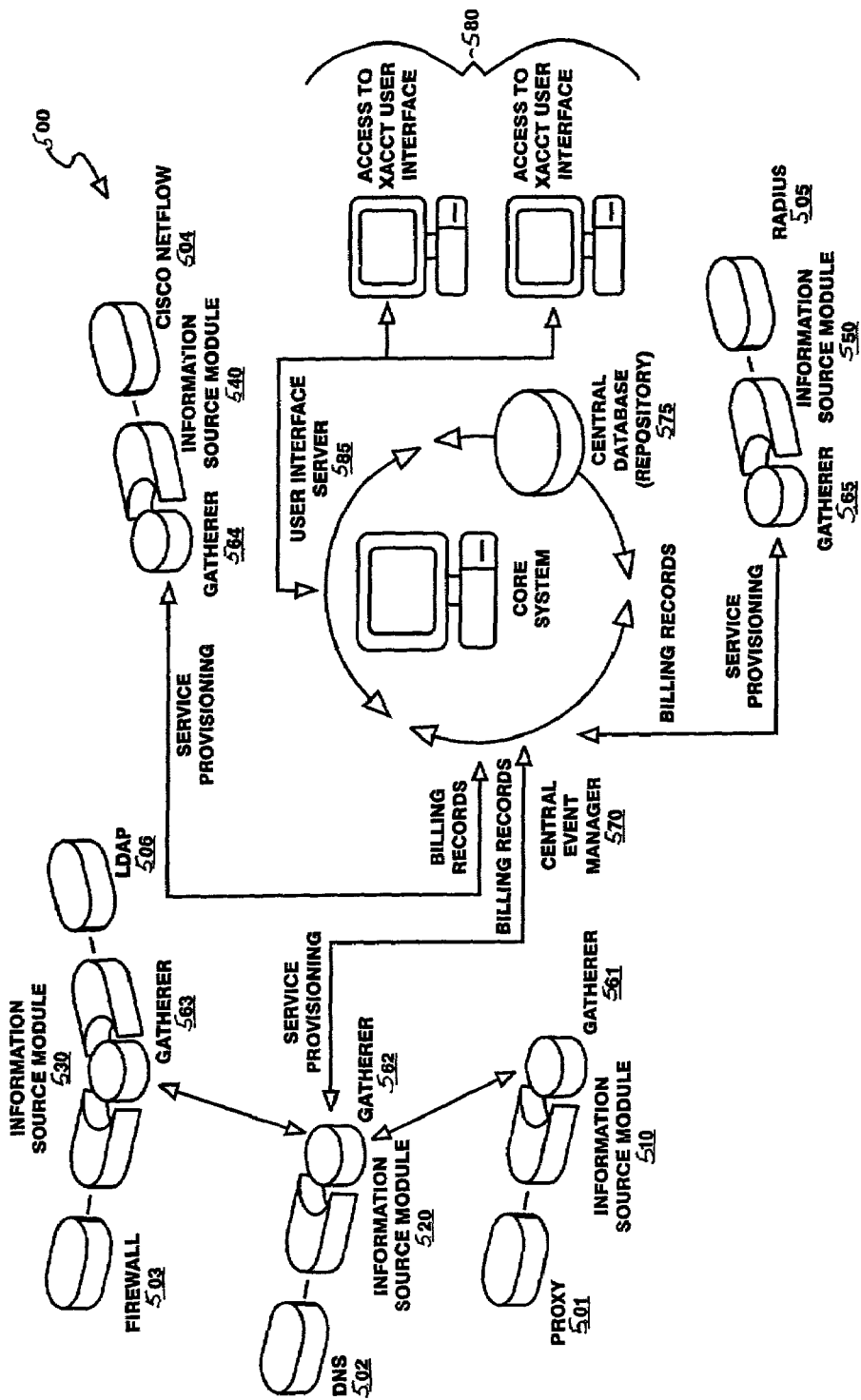
FIGS. 5–8B illustrate an alternate exemplary architecture with which the foregoing techniques may be implemented.

The following describes the system 500 of FIG. 5. The system 500 allows NSPs to account for and bill for IP network communications. The following paragraphs first list the elements of FIG. 5, then describes those elements and then describes how the elements work together. Importantly, the distributed data gathering, filtering and enhancements performed in the system 500 enables load distribution. Granular data can reside in the peripheries of the system 500, close to the information sources. This helps avoids reduce congestion in network bottlenecks but still allows the data to be accessible from a central location. In previous systems, all the network information flows to one location, making it very difficult to keep up with the massive record flows from the network devices and requiring huge databases.

The following lists the elements of FIG. 5. FIG. 5 includes a number of information source modules (ISMs) including an ISM 510, an ISM 520, an ISM 530, an ISM 536, an ISM 540, and an ISM 550. The system also includes a number of network devices, such as a proxy server 501, a DNS 502, a firewall 503, an LDAP 506, a CISCO NetFlow 504, and a RADIUS 505. The system also includes a number of gatherers, such as a gatherer 567, a gatherer 562, a gatherer 563, a gatherer 564, and a gatherer 565. The system of FIG. 5 also includes a central event manager (CEM) 570 and a central database (repository) 575. The system also includes a user interface server 585 and a number terminals or clients 580.

This paragraph describes how the elements of FIG. 5 are coupled. The various network devices represent devices coupled to an IP network such as the Internet. The network devices perform various functions, such as the proxy server 501 providing proxy service for a number of clients. Each network device is coupled to a corresponding ISM. For example, the proxy server 501 is coupled to the ISM 510. The DNS 502 is coupled to the ISM 520. The firewall 503 is coupled to the ISM 530. The ISM 536 is coupled to the LDAP 506. The ISM 540 is coupled to the CISCO NetFlow 504. The ISM 550 is coupled to the RADIUS 505. Each gatherer is associated with at least one ISM. Thus, the gatherer 561 is associated with the ISM 510 and is therefore coupled to that ISM. The gatherer 562 is coupled to the ISM 520. The gatherer 563 is coupled to the ISM 530 and the ISM 536. The gatherer 564 is coupled to the ISM 540. The gatherer 565 is coupled to the ISM 550. The various gatherers are coupled to the CEM 570. The user interface server is coupled to the terminals 580 and the CEM 570.

The following paragraphs describe each of the various elements of FIG. 5.

Network Devices

The network devices represent any devices that could be included in a network. (Throughout the description, a network device, unless specifically noted otherwise, also refers to an application server.) A network device represents a subset of information sources that can be used by the system 500. That is, the network devices are merely representative of the types of sources of information that could be accessed. Other devices such as on-line transaction processing databases can be accessed in other embodiments of the invention. Typically, the network devices keep logging and statistical information about their activity. A network information source can be the log file of a mail server, the logging facility of a firewall, a traffics statistics table available on a router and accessible through SNMP, a database entry accessible through the Internet, an authentication server's query interface, etc. The network devices represent the information sources accessed by the ISMs.

Each type of network device can be accessing using a different method or protocols. Some generate logs while others are accessible via SNMP, others have proprietary APIs or use other protocols.

ISMs

The ISMs act as an interface between the gatherers and the network devices enabling the gatherers to collect data from the network devices. Thus, the ISMs represent modular, abstract interfaces that are designed to be platform-neutral. The information source modules act as interfaces or "translators", sending IP usage data, in real time, from the network devices to the gatherers. Each ISM is designed for a specific type of network data source. (In other embodiments, some ISMs are generic in that they can extract information from multiple network devices). ISMs can be packaged separately, allowing NSPs to customize ISM configurations to meet the specific requirements of their network. For example, in the system of FIG. 5, if the NSP did not have Cisco NetFlow devices, then the ISM 540 would not have to be included.

The ISMs can communicate with its corresponding network device using protocols and formats such as UDP/IP, TCP/IP, SNMP, telnet, file access, ODBC, native API, and others.

In some embodiments, the reliability of system 500 is enhanced through on-the-fly dynamic reconfiguration, allowing the NSP to add or remove modules without disrupting ongoing operations. In these embodiments, the CEM 570 can automatically update the ISMs.

The following ISMs are available in some embodiments of the invention.

Categorizer—Classifies a session to a category according to user-defined Boolean expression.

DNS (e.g. ISM 520)—Resolves host names and IP addresses.

Generic Proxy Server (e.g., ISM 510)—Collects data from access logs in a common log format.

Port/Protocol Resolution—Converts protocol/port information to account names and vice versa.

CheckPoint FireWall-1—Collects data from FireWall-1 accounting log and security log.

Cisco IOS IP Accounting—Collects accounting data from a Cisco router using IOS IP accounting.

Cisco NetFlow Switching—Collects session data from a Cisco router via NetFlow switching.

NETRANET—Collects information from a standard network device.

Netscape Proxy Server—Collects data from a Netscape Proxy Server.

Microsoft Proxy Server—Collects data from a Microsoft ProxyServer.

ISMs can be synchronous, asynchronous or pipe. The data from an asynchronous ISM is dynamic so that the asynchronous ISM reacts to the information and relays it to the associated gatherer without prompting from other information sources in the system 500. If the firewall 503 were a CheckPoint FireWall-1, then the ISM 530 would be an example of an asynchronous ISM. When a network session is initiated, the details are recorded by the FireWall-1 503. The corresponding ISM 530 receives the details and passes them on automatically to the gatherer 563.

Synchronous ISMs provide its information only when accessed by a gatherer. The ISM 520 is an example of a synchronous ISM. The DNS server 502 maintains information matching the IP addresses of host computers to their domain addresses. The ISM 520 accesses the DNS server 502 only when the ISM 520 receives a request from the gather 562. When the DNS server 502 returns a reply, the ISM 520 relays the reply information to the gatherer 562.

Pipe ISMs operate on record flows (batches of records received from information sources). Pipe ISMs process one or more enhancement flows the records as the flows arrive. The pipe ISM may initiate new record flows or may do other things such as generate alerts or provision network elements to provide or stop services. The pipe is implemented as an ISM to keep the internal coherency and logic of the architecture. (Record flows can terminate in a database or in a pipe ISM. The pipe ISM can perform filtering and aggregation, send alarms, or act as a mediation system to provision network elements when some event occurs or some accumulated value is surpassed. Specifically, pipe ISMs can act to enable pre-payment systems to disable certain services such as a voice IP call, when the time limit is surpassed or amount of data is reached.)

The gatherers can include caches and buffers for storing information from the ISMs. The buffers allow the gatherers to compensate for situations where there is a loss of connection with the rest of the system 500. The cache sizes can be remotely configured. The cache minimizes the number of accesses to the Information Source.

ISM queries can be cached and parallelized. Caching of synchronous ISM queries provides for fast responses. Parallelizing queries allows for multiple queries to be processed at the same time.

Gatherers

The gatherers gather the information from the ISMs. In some embodiments, the gatherers are multi-threaded, lightweight, smart agents that run on non-dedicated hosts, as a normal user application on Windows NT or Unix, as a background process, or daemon. What is important though is that the gatherers can be any hardware and/or software that perform the functions of a gatherer.

The gatherers can be installed on the same network segment as the network device such as router and switch or on the application server itself. This placement of a gatherer minimizes the data traffic impact on the network.

The gatherers collect network session data from one or more ISMs. Session data can be sent to another gatherer for enhancement or to the CEM 570 for merging and storing in the central database 570. The gatherers can be deployed on an as needed basis for optimal scalability and flexibility.

The gatherers perform flexible, policy-based data aggregation. Importantly, the various types of ISMs provide different data and in different formats. The gatherers normalize the data by extracting the fields needed by the CEM 570 and filling in any fields that may be missing. Thus, the gatherers act as a distributed filtering and aggregation system. The distributed data filtering and aggregation eliminates capacity bottlenecks improving the scalability and efficiency of the system 500 by reducing the volume of data sent on the network to the CEM 570.

Aggregation can be done by accumulating groups of data record flows, generating a single data record for each group. That single record then includes the aggregated information. This reduces the flow of the data records.

Filtering means discarding any record that belongs to a group of unneeded data records. Data records are unneeded if they are known to be collected elsewhere. A policy framework enables the NSP to configure what to collect where.

Filtering and/or aggregation can be done at any point along a data enhancement (described below) so that aggregation schemes can be based on enhanced data records as they are accumulated. The filtering and/or aggregation points are treated by the system 500 as pipe ISMs which are flow termination and flow starting points (i.e.: like an asynchronous ISM on the starting end and like a database on the terminating end). Data enhancement paths and filtering and/or aggregation schemes can be based on accumulated parameters such as user identification information and a user's contract type.

As noted above, the PISM can be used in the context of filtering and/or aggregation. One or more record flows can terminate at the PISM and can be converted into one or more new record flows. Record flows are grouped based on matching rules that apply to some of the fields in the record flows, while others are accumulated or undergo some other operation such as "maximum" "average". Once the groups of accumulated records have reached some threshold, new accumulated records are output. This can be used for example in order to achieve a business-hybrid filtering and aggregation data reduction by imposing the business rules or the usage-based products that are offered to the customer, onto the record flows as they are collected in real-time. This is done instead of previous system where the information is stored in a database and then database operations are performed in order to create bills or reports. The filtering and aggregation reduces the amount of data that is stored in the central database 575 while not jeopardizing the granularity of data that is necessary in order to create creative usage-based products.

Typically, data collected from a single source does not contain all the information needed for billing and accounting, such as user name and organization. In such cases, the data is enhanced. By combining IP session data from multiple sources, such as authentication servers, DHCP and Domain Name servers, the gatherers create meaningful session records tailored to the NSP's specific requirements. In the example of FIG. 5, the gatherer 561 can provide information to the gatherer 562 so that the source IP address for an Internet session from the proxy server 501 can be combined with the domain address from the DNS server 502.

The enhancement procedure can be triggered by an asynchronous ISM. The information from the asynchronous ISM is associated with field enhancements in the central database 575. A field enhancement defines how a field in the central database is filled from the source data obtained from the asynchronous ISM. Through the field enhancements, the missing parameters are added to a record using the data collected from one or more synchronous ISMs. Enhancements are described in detail below.

The gatherers can include caches and buffers for storing information from the ISMs. The buffers allow the gatherers to compensate for situations where there is a loss of connection with the rest of the system 500. The caches can reduce the number of accesses to an information source. The buffer and/or cache sizes can be remotely configured.

Central Event Manager (CEM)

The Central Event Manager (CEM) 570 acts as the central nervous system of the system 500, providing centralized, efficient management and controls of the gatherers and the ISMs. The CEM 570 can perform one or more of the following tasks.

Coordinates, controls, and manages the data collection process. The CEM 570 coordinates the operation of the gatherers and manages the flow of data through the system 500 through the collection scheme defined in the system configuration. The latter includes the configuration of the gatherers, the ISMs, the network devices, the fields in the central database 575 (described below), and the enhancement procedures. Based on the collection scheme the CEM 570 determines the system 500's computation flow (the set of operations the system 500 must perform to obtain the desired information). The CEM 570 then controls all the gatherers, instructing them to perform, in a particular sequence, the operations defined in the computation flow. The CEM 570 receives the records collected by the gatherers and stores them in the central database 575. NSPs can configure the CEM 570 to merge duplicate records before storing them in the central database 575. Record merging is described below.

Performs clean-up and aging procedures in the database 575. The system 500 collects and stores large amounts of session information every day. The CEM 570 removes old data to free space for new data periodically. The NSP defines the expiration period for the removal of old records. The CEM 570 is responsible for coordinating the removal of records from the central database 575. The CEM 570 places a time stamp on every record when the record enters the central database 575 and deletes the record after the time period the NSP has defined elapses.

Provides centralized system-wide upgrade, licensing, and data security. The NSP can perform version upgrades of the system 500 at the CEM 570. The gatherers can be automatically upgraded once a new version is installed on the host computer of the CEM 570. ISMs are also installed via the CEM 570 and exported to the gatherers. The CEM 570 maintains a list of licenses installed in the system and verifies periodically if the system is properly licensed. This feature lets the NSP centrally install and uninstall licenses. It also prevents unlicensed use of the system 500 and any of its components.

Monitors the state of the gatherers and ISMs. The gatherers periodically communicate with the CEM 570. The CEM 570 continuously monitors the state of each gatherer and network devices in the system 500. The CEM 570 can be fault-tolerant, that is, it can recover from any system crash. It coordinates the recovery of the system 500 to its previous state.

In some embodiments, a key directory server is associated with the CEM 570. To transfer less data between the elements of the system 500, it is desirable that each piece of data to carry little descriptive data. For example, if IP address data is transferred between a gatherer and the CEM 570, a description of the IP address data is typically included. In some embodiments, data name/key, type, and length descriptions are included with the actual IP address data. In other embodiments, there the key directory server reduces the amount of descriptive information being sent. Every key in the directory server has a type and a length. Fields can be identified as variable length. Therefore, data type information need not be transmitted between elements in the system 500 if the elements use a common reference key stored in the directory server. Returning to the IP address data, by using the key directory server, elements need only send two bytes for the key id and four bytes for the actual address. Most of the data being sent in the system is relatively short in length. Therefore, the directory server helps reduce the amount of information being sent between the elements in the system 500.

Keys can be added to the directory server. The directory server can therefore support expansion of the kinds of fields being sent by allowing system elements to update their locally stored key ids. For example, after a recipient receives a record with an "unknown" key, it contacts the directory server to get the key definition.

Central Database

The central database 575 is the optional central repository of the information collected by the system 500. The central database 575 is but one example of a sink for the data generated in the system 500. Other embodiments include other configurations. The central database 575 stores and maintains the data collected by the gatherers, as well as the information on the configuration of the system 500. Thus, in configuring the system 500, the NSP defines what data will be stored in each field in the central database 575 and how that data is collected from the ISMs.

The information on network sessions is stored in the database in the form of a table. Each field in the table represents a network session parameter. Each record describes a network session. The system 500 has a set of pre-defined fields that are configured by the CEM 570 on installation. The NSP can modify the central database 575 structure by adding, deleting, or modifying fields. The NSP access the data in the central database 575 by running queries and reports. The old data is removed from the central database 575 to free space for new data periodically. You can specify the time interval for which records are stored in the central database 575. The structure of the central database 575 with some of the predefined fields is illustrated in the following figure.

As each IP session may generate multiple transaction records, during the merge process the CEM 570 identifies and discards duplications, enhancing the efficiency of the data repository. Generally, data records are passed through the merger program, in the CEM 570, into the central database 575. However, the data records are also cached so that if matching records appear at some point, the already stored records can be replaced or enhanced with the new records. The database tables that contain the record flows can be indexed, enhancing the efficiency of the data repository. A merge is achieved by matching some of the fields in a data record and then merging the matching records from at least two record flows, transforming them into one record before updating the central database 575. In some embodiments, adaptive tolerance is used to match records. Adaptive tolerance allows for a variation in the values of fields that are compared (e.g., the time field value may be allowed to differ by some amount, but still be considered a match). The adaptive aspect of the matching can include learning the appropriate period to allow for the tolerance. The reason that the records that do not match any previous records are sent through into the central database 575, in addition to being cached for later matching, is to avoid loss of data in case of system failure.

The system 500 supports a non-proprietary database format enabling the central database 575 to run on any of a number of commercially available databases (e.g., MS-SQL Server, Oracle Server, D132, etc.).

User Interface Server and Clients

The User Interface Server (UIS) 585 allows multiple clients (e.g. terminals 580) to access the system 500 through, the Microsoft Internet Explorer with Java™ Plug-in or Netscape Navigator with Java™ Plug-in. Other embodiments can use other applications to access the system 500. The main function of the UIS 585 is to provide remote and local platform independent control for the system 500. The UIS 585 can provide these functions through windows that correspond to the various components of the system 500. Access to the system 500 can be password protected, allowing only authorized users to log in to the system and protecting sensitive information.

Figure 6:
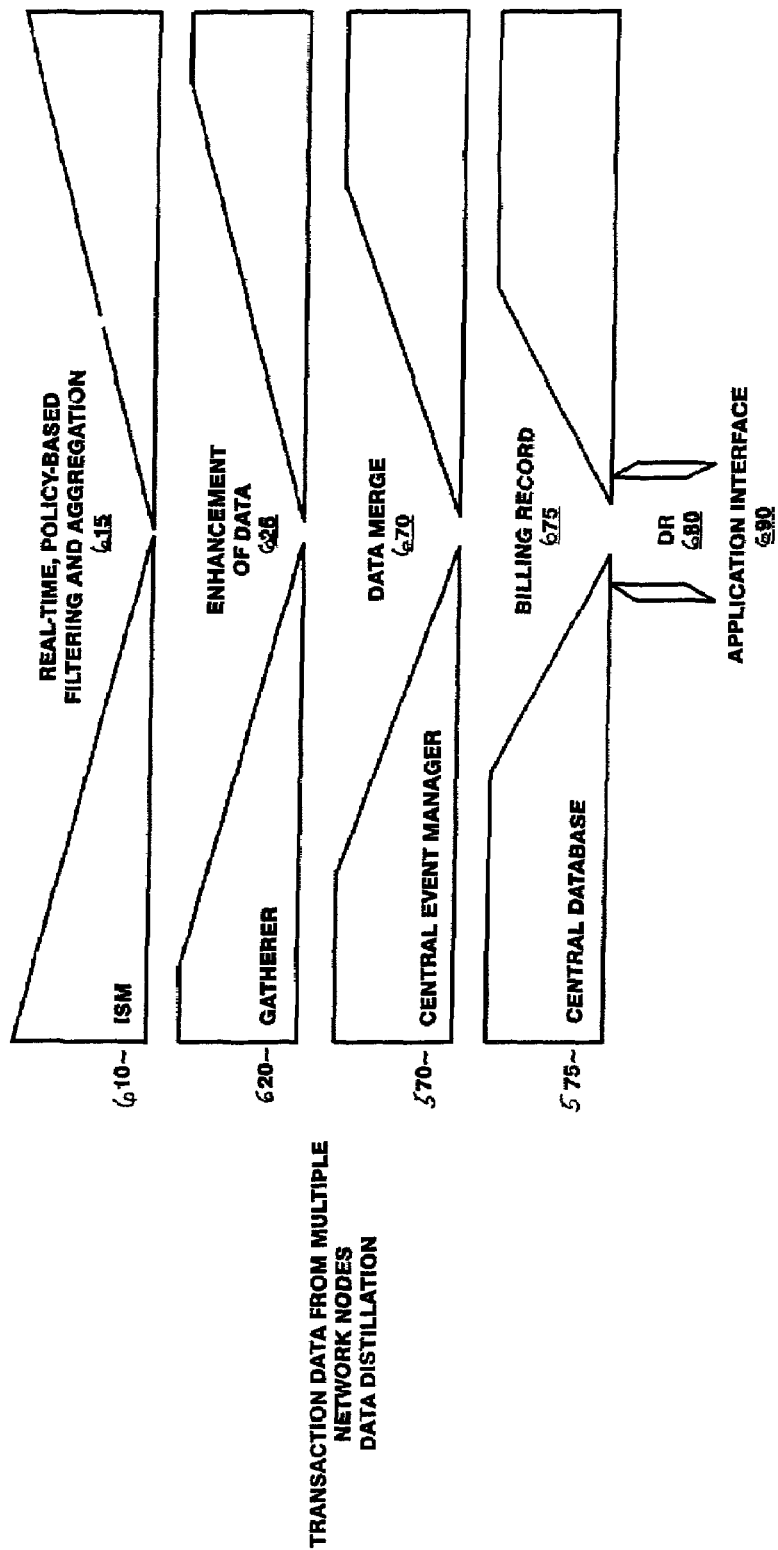

The NSP can perform one or more of the following main tasks through the UIS 585:
  Configure the system 500.
  Create and run queries and reports on network activity and resource consumption.
  Register and license the system 500.
  Data Distillation FIG. 6 illustrates the data distillation process performed by the system of FIG. 7. The data distillation aggregates and correlates information from many different network devices to compile data useful in billing and network accounting.

First, the ISMs 610 gather data from their corresponding network device. Note that for some ISMs (e.g. pipe IS7Ms), real-time, policy-based filtering and aggregation 615 can also be done. This data is then fed to the gatherers 620. The gatherers 620 perform data enhancement to complete the data from the ISMs 610. The results are provided to the CEM 570. The CEM 570 performs data merges 670 to remove redundant data. The merged data is then optionally stored in the central database 575 as a billing record 675 or is sent directly to an external system. The billing record information can be accessed from external applications, through the application interface 690, via a data record 680. Filtering and/aggregation and/or data enhancements can be done at any stage in the system 500.

Data Enhancement

As mentioned above, the gatherers 620 provide data enhancement features to complete information received from the ISMs 610. The following describes some example data enhancement techniques used in some embodiments of the invention.

Figure 7:
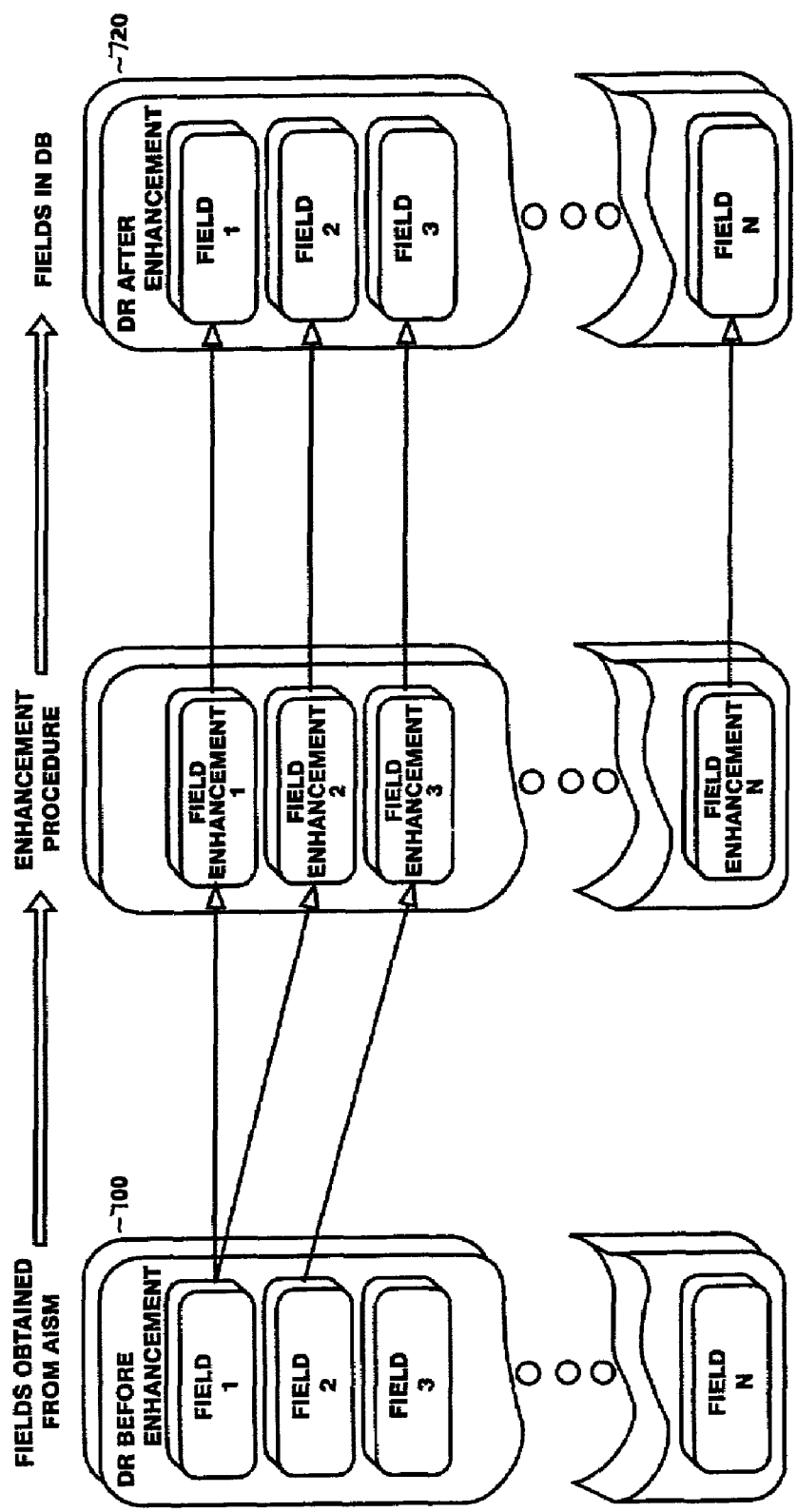

FIG. 7 illustrates an example of data enhancement. Data enhancement comprises a number of field enhancements. A field enhancement specifies how the data obtained from the trigger of the enhancement procedure is processed before it is placed in a single field in the central database 575. The data can be placed in the field directly, or new information may be added to the record by applying a Synchronous ISM function. (In the example below, the function resolves the IP address to a host FQDN"). Field enhancements may involve one or multiple steps. There is no limit to the number of steps in a Field Enhancement. The data record starts with fields obtained from an asynchronous ISM 700. The fields in the DR 700 are then enhanced using the field enhancements. The enhanced fields result in the DR 720.

A visual representation of an enhancement can be presented to the NSP. The enhancement may include an itinerary of ISMs starting off with an AISM, passing through PISMs, and terminating in the CEM 570. Using this view of the system 500, the NSP need not be shown the actual flow of data since the flow may be optimized later in order to achieve better performance. This is more of a graphical logical view of how the enhancement is achieved in steps. (PISMs can terminate more than one flow and initiate more than one flow.)

A visual representation of a field enhancement shows the per-field flow of data correlation. This process ends in the CEM 570 or in a PISM. The NSP supplies information telling the system 500 how to reach each of the terminating fields (in the CEM 570 or the PISM) starting off from the initiating fields (PISM or AISM). Each step of enhancement defines cross correlation with some SISM function.

Figure 8A:
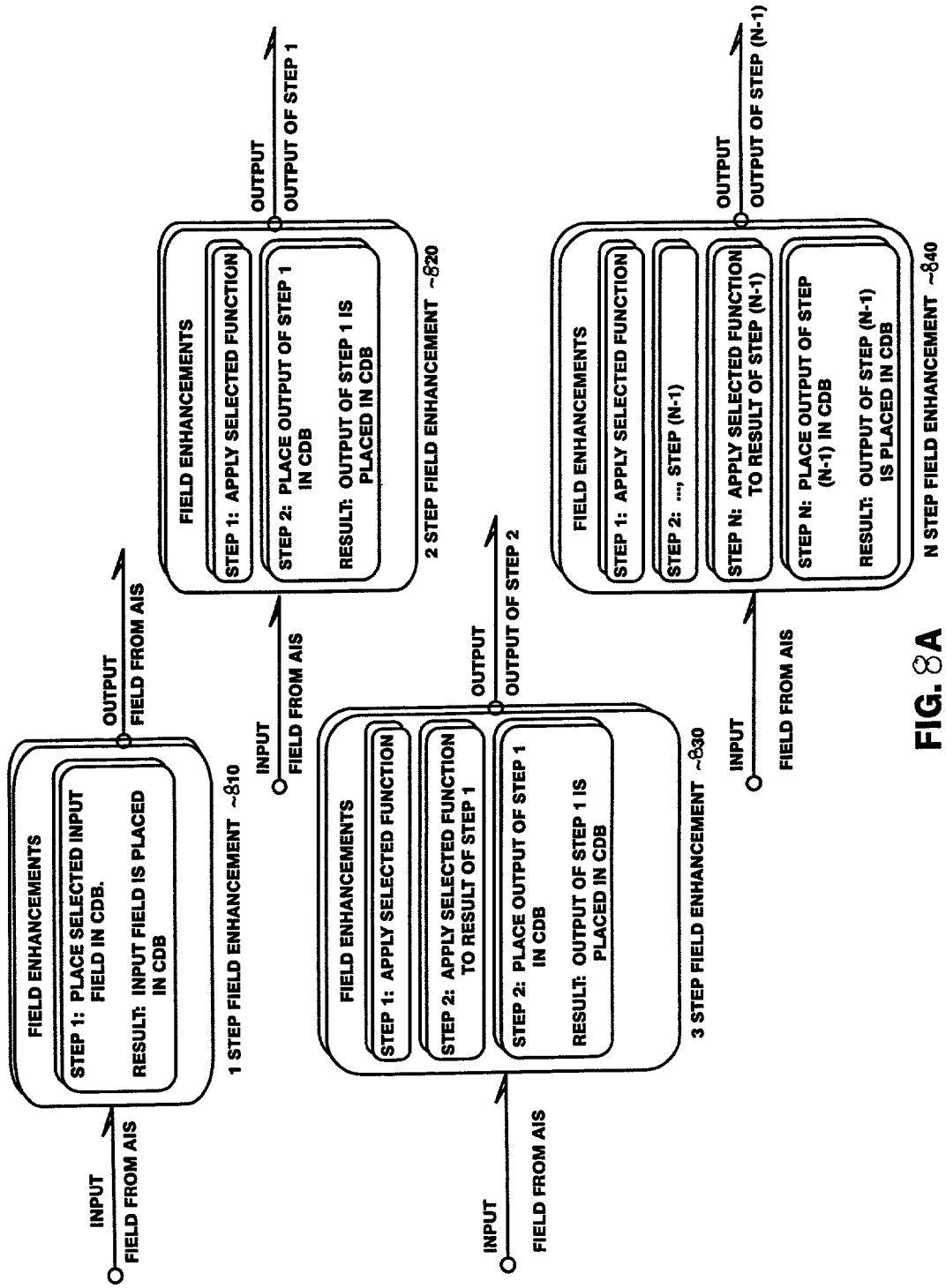

FIG. 8A illustrates various field enhancements (810 through 840). A field enhancement includes applying zero or more functions to a field before storing the field in a specified field in the central database 575.

One-step Field Enhancement 810. The initial source data from the asynchronous ISM is placed directly in a field in the central database 575. Example: the field enhancement for the Source IP field.

Two-step Field Enhancement 820. The initial source data from the asynchronous ISM is used to obtain new additional data from a synchronous network device and the new data is placed in a field in the central database 575. Example: the field enhancement for the Source Host field.

Three-step Enhancement 830. The initial source data from the asynchronous ISM is used to obtain additional data from a synchronous ISM. The result is used to obtain more data from another ISM and the result is placed in a field in the central database 575

The following illustrates an example data enhancement. Suppose the data obtained from a proxy server 501 contains the source IP address of a given session, such as 199.203.132.2, but not the complete domain address of the host computer (its Fully Qualified Domain Name), such as www.xacct.com. The name of the host can be obtained by another network device—the Domain Name System (DNS 502) server. The DNS server 502 contains information that matches IP addresses of host computers to their Fully Qualified Domain Names (FQDNs). Through an enhancement procedure the information collected from the proxy server 501 can be supplemented by the information from the DNS 502. Therefore, the name of the host is added to the data(the data record) collected from the proxy server 501. The process of adding new data to the data record from different network devices can be repeated several times until all required data is collected and the data record is placed in the central database 575.

Figure 8B:
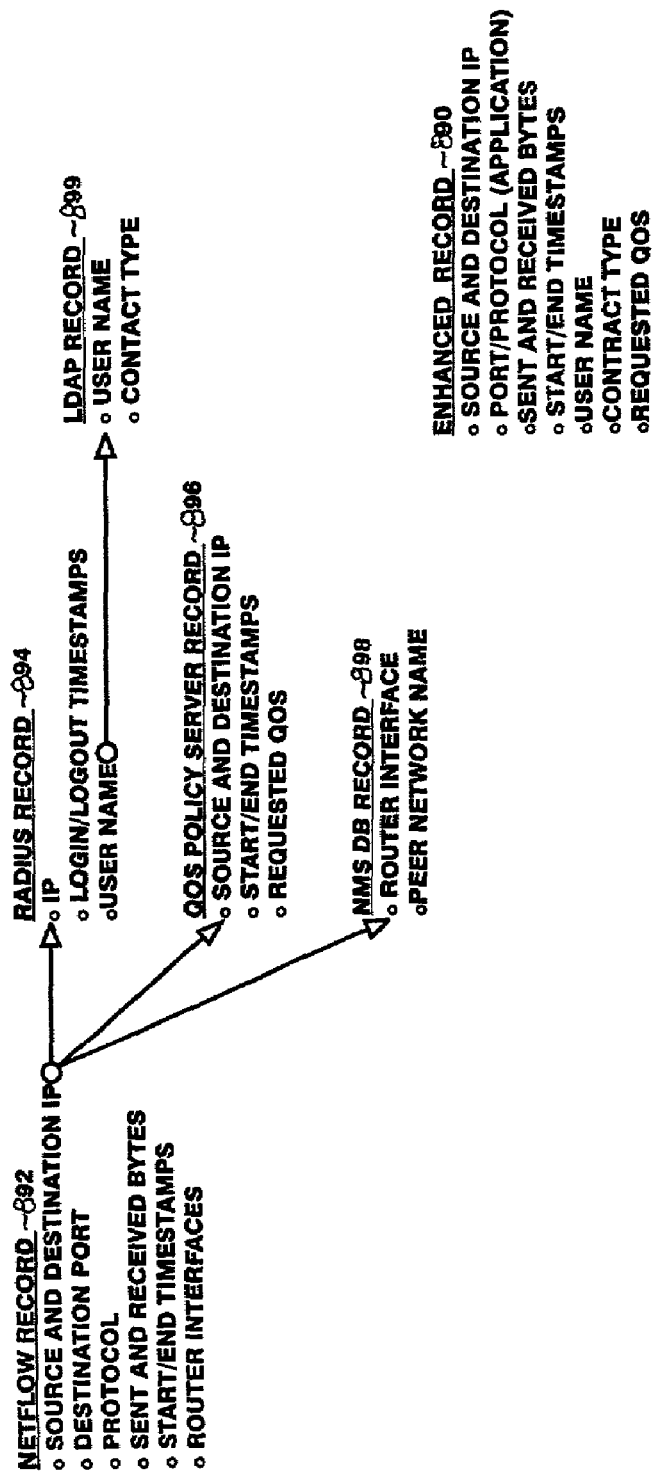

FIG. 8B illustrates another example data enhancement where an enhanced record 890 is created from an initial netflow record 892. Fields in the enhanced record 890 are enhanced from the radius record 894, the QoS policy server record 896, the NMS D 13 record 898, and the LDAP record 899.

Defining Enhancement Procedures

The following describes the process for defining enhancement procedures in some embodiments of the system. Typically defining an enhancement procedure for the system 500 includes(1) defining enhancement procedures for each asynchronous ISM and (2) configuring field enhancements for all fields in the central database 575 for which the NSP wants to collect data originating from an asynchronous ISM that triggers the corresponding enhancement procedure.

An enhancement procedure can be defined as follows.
1. Access the CEM 570 using the UIS 580
2. Select the enhancement procedures list using the UIS 780.
3. Define the name of the new enhancement procedure.
4. Select a trigger for the new enhancement procedure. The trigger can correspond to any asynchronous ISM in the system 500. Alternatively, the trigger can correspond to any asynchronous ISM in the system 500 that has not already been assigned to an enhancement procedure.
5. Optionally, a description for the enhancement procedure can be provided.
6. The new enhancement procedure can then be automatically populated with the existing fields in the central database 575. Optionally, the NSP can define the fields (which could then be propagated to the central database 575). Alternatively, based upon the type of asynchronous ISM, a preset set of fields could be proposed to the NSP for editing. What is important is that the NSP can define field procedures to enhance the data being put into the data records of the central database 575.
7. The NSP can then define the field enhancements for every field in the new enhancement procedure for which the NSP wants to collect data from the ISM that is the trigger of the new enhancement procedure.

Defining Field Enhancements

Defining a field enhancement involves specifying the set of rules used to fill a database field from the information obtained from the trigger of the enhancement procedure. The NSP defines field enhancements for each field in which NSP wants to collect data from the trigger. If no field enhancements are defined, no data from the trigger will be collected in the fields. For example, suppose the firewall asynchronous ISM 530 that triggers an enhancement procedure. Suppose the central database 575 has the following fields: source IP, source host, destination IP, destination host, user name, total bytes, service, date/time, and URL If the NSP wants to collect session data for each field except the URL from the firewall ISM 530, which triggers the enhancement procedure, the NSP defines a field enhancement for each field with the exception of the URL.

In some embodiments, the field enhancements are part of the enhancement procedure and the NSP can only define and modify them when the enhancement procedure is not enabled.

The field enhancements can be defined in a field enhancement configuration dialog box. The field enhancement configuration dialog box can have two panes. The first displays the name of the enhancement procedure, the name of its trigger, and the name and data type of the field for which the NSP is defining the field enhancement. The second is dynamic and interactive. Its content changes depending on the NSP's input. When first displayed, it has two toggle buttons, End and Continue, and a list next to them. The content of the list depends on the button depressed.

When End is depressed, the list contains all output fields whose data type matches the data type of the field for which the NSP is defining the field enhancement. For example, if the field's data type is IP Address, the list contains all fields that are of the same type, such as source IP and destination IP that the AISM supplies. The fields in the list can come from two sources: (1) the source data which the gatherer receives from the trigger and (2) the result obtained by applying a synchronous ISM function as a preceding step in the field enhancement. The following notation is used for the fields:

OutputFieldName for the output of a field origination from the trigger

SISName. FunctionName (InputArgument). OutputField for the output of a field that is the result of applying a function.

SISName . . . OutputField for the output of a field that is the result of applying a function as the final step of a field enhancement. The following examples are presented.

Source IP is the field provided by the trigger of the enhancement procedure that contains the IP address of the source host.

DNS . . . Host Name and DNS.Name(Source IP).Host name are the names of a field originating from the resolved function Name of a network device called DNS that resolves the IP address to a domain address. The input argument of the function is the field provided by the trigger of the enhancement procedure, called source IP. It contains the IP address of the source host. The function returns the output field called Host Name that contains the domain address of the source host. The notation DNS . . . Host Name is used when the field is the result of applying the function as the final step of a field enhancement. The notation is DNS.Name (Source IP).Host Name is used when the field is used as the input to another function.

In the user interface, if End is unavailable, none of the output fields matches the data type of the field.

When Continue is depressed, the list contains all applicable functions of the available synchronous network device configured in the system 500. If the preceding output does not match the input to a function, it cannot be applied and does not appear on the list.

The following notation is used for the functions.
SISName.FunctionName(InputFieldName:InputField-
DataType)(OutputFieldNa me.-OutputFieldDataType)

When the function has multiple input and/or output arguments, the notation reflects this. The arguments are separated by commas.

The following example shows a field enhancement.
DNS. Address(Host Name:String)->(IP Address:IP Address)

Where DNS is the name of the synchronous ISM (or network device) as it appears in the system configuration.

Address is the name of the function.

(Host Name:String) is the input to the function—host FQDN of data typeString (IP Address:IP Address) is the output—IP address of data type IPAddress The NSP can define the field enhancement by choosing items from the list. The list contains the option <none> when the End button is depressed. Choosing this option has the same effect as not defining a field enhancement: no data from the trigger will be stored in the field in the central database 575.

Additional Embodiments

The following describes additional embodiments of the invention.

In some embodiments, the user interface used by an NSP to configure the system 500 can be presented as a graphical representation of the data enhancement process. Every step in the enhancement can be shown as a block joined to another block(or icon or some graphical representation). The properties of a block define the operations within the block. In some embodiments, the entire data enhancement process from network devices to the central database 575 can be shown by linked graphics where the properties of a graphic are the properties of the enhancement at that stage.

In some embodiments, multiple CEMs 570 and/or central databases 575 can be used as data sources(back ends) for datamart or other databases or applications (e.g., customer care and billing systems).

In some embodiments, the types of databases used are not necessarily relational. Object databases or other databases can be used.

In some embodiments, other platforms are used. Although the above description of the system 500 has been IP network focused with Unix or Windows NT systems supporting the elements, other networks(non-IP networks) and computer platforms can be used. What is important is that some sort of processing and storing capability is available at the gatherers, the CEMs, the databases, and the user interface servers.

In some embodiments, the gatherers and other elements of the system 500, can be remotely configured, while in other embodiments, some of the elements need to be configured directly. For example, a gatherer may not be remotely configurable, in which case, the NSP must interface directly with the computer running the gatherer.

In other embodiments, the general ideas described herein can be applied to other distributed data enhancement problems. For example, some embodiments of the invention could be used to perform data source extraction and data preparation for data warehousing applications. The gatherers would interface with ISMs that are designed to extract data from databases(or other data sources). The gatherers would perform filtering and aggregation depending upon the needs of the data mart (in such an embodiment, the central database and CEM could be replaced with/used with a data mart). The data enhancement.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A meted for synchronizing a first table and a second table, comprising:

(a) determining a threshold value amount;
(b) synchronizing a first table wit a second table; and
(c) wherein a manner in which the synchronization is executed is based on the threshold value amount;
(d) wherein occurrences of when data is not synchronized between the first table and the second table are tracked, values associated with the data are identified, and the values are processed to determine if the threshold value amount is exceeded.

2. The method as recited in claim 1, wherein the threshold value amount is indicative of an amount of value corresponding to a lack of perfect synchronization between the first table and the second table.

3. The method as recited in claim 2, wherein the components of the data being synchronized have a value amount associated therewith.

4. The method as recited in claim 2, and further comprising determining whether a user is affected by the lack of perfect synchronization between the first table and the second table.

5. The method as recited in claim 2, and further comprising determining whether a set of users are affected by the lack of perfect synchronization between the first table and the second table.

6. The method as recited in claim 5, wherein the threshold represents an average value considering a number of the users.

7. The method as recited in claim 5, and further comprising determining a number of the users affected by the lack of perfect synchronization between the first table and the second table.

8. The method as recited in claim 7, and further comprising rejecting the synchronization if the number of the users exceeds a predetermined amount.

9. The method as recited in claim 2, and further comprising rejecting the synchronization if at least one predetermined user is affected by the lack of perfect synchronization between the first table and the second table.

10. The method as recited in claim 2, and further comprising rejecting the synchronization if an average amount of lack of synchronization among a plurality of users exceeds a threshold.

11. The method as recited in claim 1, and further comprising rejecting the synchronization if the threshold value amount is exceeded.

12. The method as recited in claim 1, wherein the value is in terms of monetary value.

13. The method as recited in claim 1, wherein the tables are components of databases.

14. The method as recited in claim 13, wherein at least one of the databases is persistent.

15. The method as recited in claim 1, wherein the first table and the second table are synchronized utilizing the Internet.

16. The method as recited in claim 1, and further comprising rejecting the synchronization if the threshold of a predetermined user is exceeded.

17. The method as recited in claim 1, wherein a trigger with which the synchronization is executed is based on the threshold value amount.

18. A method for synchronizing a first table and a second table, comprising:
    (a) determining a threshold value amount; and
    (b) synchronizing a first table with a second table;
    (c) wherein a manner in which the synchronization is executed is based on the threshold value amount;
    (d) wherein the threshold value amount is indicative of an amount of value corresponding to a lack of perfect synchronization between the first table and the second tablet;
    (e) wherein the components of data being synchronized have a value amount associated therewith;
    (f) wherein occurrences of when the data is not synchronized between the first table and the second table are tracked, values associated with the data are identified, and the values are added to a sum to determine if the threshold value amount is exceeded.

19. A computer program product embodied on a computer readable medium for synchronizing a first table and a second table, comprising:
    (a) computer code for determining a threshold value amount;
    (b) computer code for synchronizing a first table with a second table; and
    (c) wherein a manner in which the synchronization is executed is based on the threshold value amount;
    (d) wherein occurrences of when data is not synchronized between the first table and the second table are tracked, values associated with the data are identified, and the values are processed to determine if the threshold value amount is exceeded.

20. A system for synchronizing a first table and a second table, comprising:
    (a) logic for determining a threshold value amount;
    (b) logic for synchronizing a first table with a second table; and
    (c) wherein a manner in which the synchronization is executed is based on the threshold value amount;
    (d) wherein occurrences of when data is not synchronized between the first table and the second table are tracked, values associated with the data are identified, and the values are processed to determine if the threshold value amount is exceeded.

21. A method for synchronizing a first table and a second table, comprising:
    (a) determining a threshold value amount;
    (b) synchronizing a first table with a second table; and
    (c) rejecting the synchronization if the threshold value amount is exceeded;
    (d) wherein occurrences of when data is not synchronized between the first table and the second table are tracked, values associated with the data are identified, and the values are processed to determine if the threshold value amount is exceeded.

22. The method as recited in claim 21, wherein the value is in terms of monetary value.

23. A computer program product embodied on a computer readable medium for synchronizing a first table and a second table, comprising:
    (a) computer program product for determining a threshold value amount;
    (b) computer program product for synchronizing a first table with a second table; and
    (c) computer program product for rejecting the synchronization if the threshold value amount is exceeded;
    (d) wherein occurrences of when data is not synchronized between the first table and the second table are tracked, values associated with the data are identified, and the values are processed to determine if the threshold value amount is exceeded.

24. The computer program product as recited in claim 23, wherein the value is in terms of monetaty value.

* * * * *

UNITED STATES PATENT AND TRADEMARK OFFICE
CERTIFICATE OF CORRECTION

PATENT NO. : 7,124,204 B2  
APPLICATION NO. : 10/045609  
DATED : October 17, 2006  
INVENTOR(S) : Givoly et al.

Page 1 of 1

It is certified that error appears in the above-identified patent and that said Letters Patent is hereby corrected as shown below:

In the claims:
    Claim 1, col. 16, line 66; please replace "meted" with --method--;
    Claim 1, col. 17, line 2; please replace "wit" with --with--;
    Claim 18, col. 18, line 4; please replace "tablet" with --table--;
    Claim 24, col. 18, line 65; please replace "monetaty" with --monetary--.

Signed and Sealed this
Eleventh Day of March, 2014

Michelle K. Lee
*Deputy Director of the United States Patent and Trademark Office*